(12) United States Patent
Guiet

(10) Patent No.: US 11,446,972 B2
(45) Date of Patent: *Sep. 20, 2022

(54) AGRICULTURAL IMPLEMENT, TOW BAR DEVICE, AND TOWING VEHICLE/IMPLEMENT COMBINATION

(71) Applicant: DEERE & COMPANY, Moline, IL (US)

(72) Inventor: Lionel Guiet, Gray (FR)

(73) Assignee: DEERE & COMPANY, Moline, IL (US)

( * ) Notice: Subject to any disclaimer, the term of this patent is extended or adjusted under 35 U.S.C. 154(b) by 366 days.

This patent is subject to a terminal disclaimer.

(21) Appl. No.: 16/717,103

(22) Filed: Dec. 17, 2019

(65) Prior Publication Data

US 2020/0247196 A1 Aug. 6, 2020

(30) Foreign Application Priority Data

Feb. 1, 2019 (DE) .......................... 102019201337.6

(51) Int. Cl.
| | | |
|---|---|---|
| B60D 1/14 | (2006.01) | |
| A01B 59/00 | (2006.01) | |
| A01B 59/042 | (2006.01) | |
| B60D 1/145 | (2006.01) | |
| B60K 25/00 | (2006.01) | |
| B62D 49/06 | (2006.01) | |

(52) U.S. Cl.
CPC ............ *B60D 1/143* (2013.01); *A01B 59/002* (2013.01); *A01B 59/042* (2013.01); *B60D 1/145* (2013.01); *B60K 25/00* (2013.01); *B62D 49/065* (2013.01)

(58) Field of Classification Search
CPC ...... B60D 1/143; B60D 1/145; A01B 59/002; A01B 59/042; B60K 25/00; B62D 49/065
See application file for complete search history.

(56) References Cited

U.S. PATENT DOCUMENTS

| | | |
|---|---|---|
| 4,065,914 A | 1/1978 | Phillips et al. |
| 5,255,756 A | 10/1993 | Follmer et al. |
| 9,706,697 B2 | 7/2017 | Wilkening et al. |
| 10,462,953 B2 | 11/2019 | Frascella |

(Continued)

FOREIGN PATENT DOCUMENTS

| | | |
|---|---|---|
| DE | 000D0008107MAZ | 2/1951 |
| DE | 102009047585 A1 | 6/2011 |

(Continued)

OTHER PUBLICATIONS

Anderson, Biobaler, pp. 1-12.
European Search Report issued in counterpart application No. 20153570.5 dated Jul. 6, 2020 (08 pages).

*Primary Examiner* — Jacob D Knutson

(57) ABSTRACT

Agricultural implement having a tow bar device for towing the implement with a towing vehicle includes an implement part that trails the tow bar device mounted so as to be pivotable about a first pivot axis. The first pivot axis is parallel to a horizontal transverse axis of the implement. The trailing implement part and the tow bar device are coupled by means of at least one first actuator. The tow bar device, by means of the first actuator, is pivotable about the first pivot axis in such a manner that a tilt angle between the tow bar device and the trailing implement part is adjustable.

18 Claims, 6 Drawing Sheets

(56) References Cited

U.S. PATENT DOCUMENTS

| | | | |
|---|---|---|---|
| 2004/0060715 A1* | 4/2004 | Hoelscher | B60D 1/02 |
| | | | 172/272 |
| 2005/0194156 A1* | 9/2005 | Job | A01B 45/026 |
| | | | 172/21 |
| 2018/0228075 A1 | 8/2018 | Czapka et al. | |

FOREIGN PATENT DOCUMENTS

| | | | | |
|---|---|---|---|---|
| EP | 1205097 A1 * | 5/2002 | | A01B 59/042 |
| EP | 2082637 A1 | 7/2009 | | |
| WO | WO-2013175097 A1 * | 11/2013 | | A01B 71/06 |
| WO | WO2013175097 A1 | 11/2013 | | |

* cited by examiner

AGRICULTURAL IMPLEMENT, TOW BAR DEVICE, AND TOWING VEHICLE/IMPLEMENT COMBINATION

CROSS-REFERENCE TO RELATED APPLICATIONS

This application claims the benefit of German Patent Application No. 102019201337.6, filed on Feb. 1, 2019, the disclosure of which is hereby incorporated by reference.

TECHNICAL FIELD

The disclosure generally relates to an agricultural implement having a tow bar device.

BACKGROUND

Agricultural implements may include a tow bar device for towing the implement with a towing vehicle. The tow bar device, at one end thereof by means of a first pivot bearing, is mounted on an implement part of the agricultural implement that trails the tow bar device so as to be pivotable about a horizontal transverse axis.

DE 2710097 discloses an agricultural implement, e.g., a round bale press, having a tow bar device in which by means of a first pivot bearing is pivotably mounted on the trailing implement part. As such, the tow bar device of the agricultural implement may bend or pivot in relation to the trailing implement part.

EP 2082637 A1 similarly discloses a towed agricultural implement in which the tow bar is adjustable in relation to the trailing implement such that the towed agricultural implement may be positioned and/or run lateral to the track of the towing vehicle.

The prior art displays a shortcoming in terms of the variability of an adjustment capability of the implement, in particular of the height of the tow bar device and/or of the trailing implement part. Moreover, in the operating state of the implement a torque or a force by virtue of torsion, dragging, or tilting of the trailing implement part can engage on the connection between the tow bar device and the trailing implement part in such a manner that the latter is damaged or even destroyed. A substantial problem of the known implements having tow bar devices is thus that said tow bar devices in terms of construction are designed so as to be insufficiently flexible as well as prone to malfunctioning and unstable.

It is therefore an object of the disclosure to propose an agricultural implement, a tow bar device, and a towing vehicle/implement combination which avoid the known disadvantages. In particular to propose an agricultural implement, a tow bar device and a towing vehicle/implement combination which are designed in such a manner that the implement, device and combination have a better adjustment capability and/or setting capability in terms of height and/or withstand stress by way of higher torques and/or forces.

SUMMARY

An agricultural implement is provided. The implement includes a frame and a tow bar. At least one first pivot bearing rotatably interconnects the frame and the tow bar, whereby the tow bar is rotatable about a first pivot axis relative to the frame. The first pivot axis is horizontal and is transverse to a longitudinal axis of the frame. A first actuator interconnects the frame and the tow bar. The first actuator is operable to rotate the tow bar about the first pivot axis relative to the frame to adjust a tilt angle defined between a longitudinal axis of the tow bar and a vertical axis of the frame.

In one aspect of the disclosure, the at least one first pivot bearing includes a pair of first pivot bearings, with each of the pair of first pivot bearings being laterally offset along the first pivot axis to opposite sides of the frame relative to the first vertical axis and relative to the longitudinal axis of the frame.

In one aspect of the disclosure, a yoke interconnects the frame and the tow bar, such that the yoke and the tow bar rotate together about the first pivot axis. A second pivot bearing rotatably interconnects the yoke and the tow bar. The tow bar is rotatable about a first vertical axis relative to the yoke. An arm is attached to the tow bar and is disposed vertically below the tow bar. The arm is rotatable with the tow bar relative to the yoke about the first vertical axis. A third pivot bearing rotatably interconnects the yoke and the arm.

In one aspect of the disclosure, the second pivot bearing and the third pivot bearing are co-axially located along the first vertical axis. In another aspect of the disclosure, the second pivot bearing and the third pivot bearing are spaced apart from each other along the first vertical axis.

In one aspect of the disclosure, a drive component is disposed between the arm and the tow bar, and further disposed between the second pivot bearing and the third pivot bearing.

In one aspect of the disclosure, a second actuator interconnects the frame and the tow bar. The second actuator is operable to rotate the tow bar about the first vertical axis relative to the yoke to adjust a pivot angle defined between the longitudinal axis of the tow bar and the longitudinal axis of the frame.

In one aspect of the disclosure, a control unit is disposed in communication with the first actuator and/or the second actuator. The control unit is operable to control the first actuator to adjust the tilt angle. The control unit is further operable to control the second actuator to adjust the pivot angle.

The above features and advantages and other features and advantages of the present teachings are readily apparent from the following detailed description of the best modes for carrying out the teachings when taken in connection with the accompanying drawings.

DETAILED DESCRIPTION

Figure 1A:
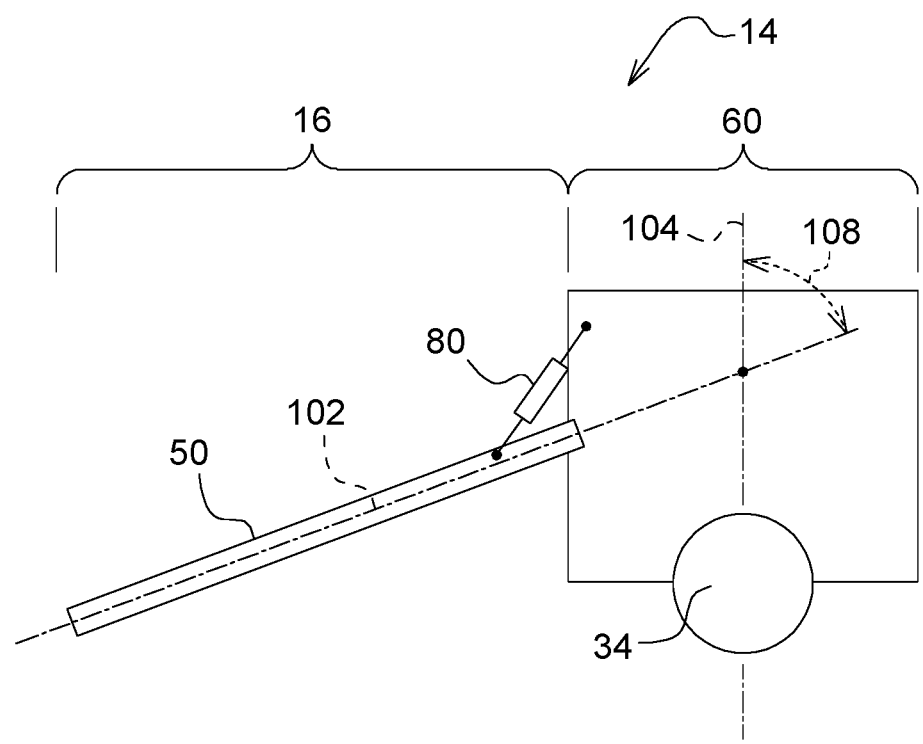
FIG. 1A is a schematic illustration of a first example embodiment of an agricultural implement having a tow bar device.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

In one aspect of the disclosure, an agricultural implement having a tow bar device for towing the agricultural implement with a towing vehicle is provided. The implement includes a ground-engagement means for support on the soil. Furthermore, the tow bar device is attached to an implement part of the agricultural implement that trails the tow bar device, and is mounted so as to be pivotable about a first pivot axis that is parallel to a transverse axis, in particular a horizontal transverse axis, of the agricultural implement. Moreover, the trailing implement part and the tow bar device are coupled to at least one first actuator. The tow bar device by means of the first actuator is pivotable about the first pivot axis in such a manner that a tilt angle between the tow bar device, in particular the tow bar, and the trailing implement part is adjustable, in particular capable of being set and/or capable of being fixedly established.

The agricultural implement may include, but is not limited to, vehicle for harvested goods, for example a bale press for rectangular or round bales, preferably a round bale press, or a loader wagon, in particular having a receiving installation, or a mower, or a hay-making machine, or a rotary hay rake, or a swath rake. The ground-engagement means can either be wheels or track chains and can be coupled to the trailing implement, in particular by means of an implement axle, by way of a frame or a chassis of the trailing implement part. The agricultural implement can be supported on the soil especially by wheels. The implement, in particular the trailing implement part, can comprise a tilling element that interacts with a field. The tilling element can in particular be a goods-receiving unit which serves for receiving a swath from the soil. The implement, in particular the trailing implement part, can furthermore comprise a container, in particular in the form of a press chamber or a loading container, for receiving the harvested goods. The tow bar device comprises the tow bar which can in particular be an elongate tow bar. The tow bar can moreover comprise the tow bar yoke. The tow bar at another end can have a connector installation, for example a towing eye, for coupling the tow bar device to the towing vehicle so that the implement by means of the tow bar device is capable of being coupled to the towing vehicle. To this end, for example a coupling part, for example a coupling or a coupling yoke may be provided for disposal on the towing vehicle. On account thereof, the coupling part and the connector installation can be capable of being coupled to one another at a coupling point of the coupling part and/or at an articulation point that is spaced apart from the coupling point. The tow bar yoke can be configured as a yoke-shaped component. The tow bar yoke can in particular be mounted so as to be pivotable on the frame of the implement. The tow bar yoke can be disposed between the tow bar and the trailing implement part. The tow bar device, in particular the tow bar or the tow bar yoke, by means of a first pivot bearing on the trailing implement part can be mounted so as to be pivotable about the first pivot axis.

An implement vertical axis, e.g., a central vertical axis of the agricultural implement, in combination with a longitudinal axis of the implement, e.g., a longitudinal axis of the tow bar, may enclose a tilt angle. The tilt angle may vary between 75 degrees to 105 degrees. In one example, the tilt angle may vary between 85 degrees to 95 degrees. In another example, the tilt angle is approximately equal to 90 degrees. The first pivot axis can especially be an axis that is orthogonal to the longitudinal axis and/or vertical axis of the implement, or to the longitudinal axis of the tow bar. The first pivot axis can be a horizontal or horizontally running axis. The first pivot axis can be parallel to, or in spatial terms coincide with, thus in particular be coaxial with, a horizontal transverse axis of the implement. The horizontal transverse axis can be orthogonal to the longitudinal axis of the implement and orthogonal to the implement vertical axis.

Independently of whether the tow bar device is configured with or without a tow bar yoke, the tilt angle can be an angle between the tow bar device, in particular the tow bar, and the trailing implement part. The tilt angle can be an angle that is enclosed by a longitudinal axis of the tow bar, in particular the longitudinal central axis of the tow bar, and the implement vertical axis, preferably in a plane which is defined by the longitudinal axis of the tow bar and the implement vertical axis, particularly preferably in a vertical plane which is defined by the longitudinal axis of the tow bar and the implement vertical axis. The implement vertical axis can be an axis that is vertical to the longitudinal axis of the implement. The tilt angle can be 20 degrees to 160 degrees. On one embodiment, the tilt angle is between 40 degrees to 130 degrees. In another embodiment, the tilt angle is between 60 degrees to 120 degrees.

The first actuator can be articulated on, in particular coupled and/or fastened to, the trailing implement part and the tow bar device, in particular the tow bar or the tow bar yoke, in such a manner that the tilt angle is adjustable, in particular also capable of being set and/or fixedly established, by activating the first actuator. The tow bar device, in particular the tow bar yoke, by means of one or two, or a plurality of, first pivot bearings on the trailing implement part can be mounted so as to be pivotable about the first pivot axis. At least one, but possibly two, three, four, or more, first actuators can be provided. The first actuator can preferably be configured as a hydraulic cylinder. However, it is also conceivable for another activating mode, for example an electric, mechanical or pneumatic activating mode, in particular of a cylinder to be chosen. The first actuator can thus also be configured as an electric motor, for example a spindle motor. A corresponding assembly having a cable pull is also conceivable in order for the activation to be designed to be purely mechanical.

Because the adjustment and the setting of the tilt angle is enabled by this disclosure, a height of the tow bar device or of the trailing implement part in relation to the ground can advantageously be adjusted, preferably set and/or fixedly established, in particular the height of the tow bar device be automatically set such that it is easier for the connector device to be connected to a towing vehicle. Moreover, the height of the implement, preferably of the tilling element, particularly of the goods receiver, can advantageously be set in relation to the ground on account thereof. For example, a height of the tilling element can be set on account thereof in order for the harvest to be optimized (lower position), or else the ground clearance can be increased, for example when crossing the swath or when entering a field, driving past a dip, etc. The height of the implement can thus be adapted in a simple manner. On account of this measure, different vertical offsets of the implement, in particular mutual vertical offsets of the tow bar device and the trailing implement part, can moreover be set.

In aspect of the disclosure, the tow bar device and the trailing implement part are coupled by means of the first actuator. However, in another design configuration, the tow bar device may further include a tow bar yoke, wherein the tow bar is coupled to the tow bar yoke, and the trailing implement part and the tow bar yoke are coupled by means of the first actuator. The tow bar or the tow bar yoke, by means of a first pivot bearing on the trailing implement part, can be mounted so as to be pivotable about the first pivot axis.

In one aspect of the disclosure, the tow bar at one end, by means of a second pivot bearing, is mounted on an implement part that trails the tow bar device or on the tow bar yoke so as to be pivotable about a first vertical axis, and/or the tow bar device includes a tow bar arm which extends from the tow bar. The tow bar arm at one end of the tow bar arm, by means of a third pivot bearing, is mounted on the trailing implement part or on the tow bar yoke so as to be pivotable about a second vertical axis. The first and/or the second vertical axis, conjointly with the longitudinal axis of the implement, in particular the longitudinal central axis of the implement, and/or the longitudinal axis of the tow bar, in particular the longitudinal central axis of the tow bar, may enclose an angle of between 75 degrees to 105 degrees. In one embodiment, the angle may vary between 85 degrees to 95 degrees. In another embodiment, the angle is substantially equal to 90 degrees. The first and/or the second vertical axis can be an axis that is vertical or runs vertically to the longitudinal axis of the implement or to the longitudinal axis of the tow bar, in particular also an orthogonal axis. The tow bar arm can be configured as part of the tow bar or else as a component that is separate from the tow bar and is connectable to the tow bar, or as a component that is connectable to the tow bar. The tow bar arm can be spaced apart from and/or parallel to the tow bar and/or extend in the direction of the second pivot bearing, in particular extend parallel to the tow bar in the direction of the second pivot bearing. The tow bar yoke can be mounted so as to be pivotable on the implement, in particular on the frame of the implement. The torques and/or forces of the trailing implement part and/or of the towing vehicle that act on the implement, in particular on the tow bar device, thus are advantageously distributed in particular by way of the tow bar and the tow bar arm and/or the second and the third pivot bearing. The agricultural implement having the tow bar device thus has the advantage that the stability of the coupling of the tow bar device to the trailing implement part is increased and the distribution of forces is optimized. On account thereof, the implement, in particular the connection of the trailing implement part to the tow bar device, and/or the coupling of the implement to the towing vehicle, are less prone to malfunctioning and/or configured so as to be more stable in terms of construction. Urging of the implement, in particular of individual components and/or of the tow bar device is moreover also advantageously avoided, a static overdeterminacy or indeterminacy being in particular avoided. The setting of the tilt angle can moreover advantageously be combined with the setting of the pivot angle.

The implement can moreover include a drive component, and the drive component can be disposed between the first and the second pivot bearing. The drive component herein can be guided through the tow bar arm and/or be mounted in the tow bar arm. The drive component can be a shaft by way of which a power take-off shaft of the towing vehicle is capable of being connected to a drive shaft of the implement and driven. The drive component can be configured in two or multiple parts, for example including a first and a second drive component part, in particular a first and a second shaft part. The first and the second drive component parts can be connected to one another by means of a universal joint. The universal joint can be mounted in the tow bar arm. The first drive component part can be capable of being coupled to the power take-off shaft of the towing vehicle and the universal joint, and the second drive component part can be capable of being coupled to the universal joint and the drive shaft of the implement.

The second drive component part can be disposed between the first and the second pivot bearing, particularly preferably below the first pivot bearing and above the second pivot bearing. The torques and/or forces of the implement and/or of the towing vehicle that act on the drive component thus are also advantageously better distributed such that the drive component is less prone to malfunctioning and/or the assembly of the drive component is configured so as to be more stable in terms of construction. Urging and/or a static overdeterminacy or indeterminacy, respectively, of the drive component is moreover also advantageously avoided.

The tow bar arm can include a tensioning installation. The tensioning installation at one end of the tensioning installation can include the second pivot bearing and/or at another end of the tensioning installation can comprise a third pivot bearing by way of which the tensioning installation is mounted so as to be pivotable on the tow bar arm. The second and/or the third pivot bearing can be coupled to the tensioning installation, or be fastened thereto, or be configured so as to be integral to the tensioning installation. The tensioning installation can be a length-adjustable tensioning installation. The tensioning installation can thus be designed in such a manner that positional fixing and/or a reciprocating movement and/or an elongation and/or a coaxial movement, in particular along the longitudinal axis of the tensioning device, is enabled between the second and the third pivot bearing. The second and/or the third pivot bearing can be ball bearings. The third pivot bearing can be pivotable about a third vertical axis. The third vertical axis can be parallel to the first and the second vertical axis. The first, the second, and the third vertical axis can be disposed in one plane. The torques and/or forces that act on the tensioning device and the second and/or the third pivot bearing thus are advantageously better distributed to the implement, in particular the tow bar device, such that the implement, in particular the tow bar device, is less prone to malfunctioning.

In one aspect of the disclosure, the first and the second vertical axis are disposed so as to be mutually parallel, or the first and the second vertical axis in spatial terms are disposed so as to coincide, in particular are disposed so as to be mutually coaxial, and form a common vertical axis, and the second and the third pivot bearing are disposed so as to be mutually spaced apart along the common vertical axis. The first and the second pivot bearing, in particular in a state installed in the implement, can thus be disposed so as to be mutually coaxial along the common vertical axis. The common vertical axis, conjointly with the longitudinal axis of the implement, in particular the longitudinal central axis of the implement, and/or the longitudinal axis of the tow bar, in particular the horizontal central axis of the tow bar, can enclose an angle of between 75 degrees to 105 degrees, such as between 85 degrees to 95 degrees, and substantially equal to 90 degrees. The common vertical axis can be a common vertical axis that runs vertically to the longitudinal axis of the implement or to the longitudinal axis of the tow bar, in particular an orthogonal common vertical axis. The measure, preferably the disposal of the first and the second pivot axis along the common vertical axis and the disposal of the first and the second pivot bearing along the common vertical axis, has the advantage of a better distribution of the forces and/or torques, in particular of avoiding urging and/or static overdeterminacy. A coupling of the trailing implement part to the tow bar device that is simple in terms of construction and simultaneously more stable can thus be configured, wherein furthermore an optimal pivoting capability of the trailing implement part in relation to the tow bar device is provided.

In one aspect of the disclosure, the trailing implement part and the tow bar, or the tow bar yoke and the tow bar, are coupled by means of at least one second actuator. The tow bar and/or the trailing implement part, or the tow bar and/or the tow bar yoke herein by means of the second actuator are pivotable about the first and the second vertical axis or the common vertical axis in such a manner that a pivot angle between the tow bar and the trailing implement part is adjustable, in particular capable of being set and fixedly established. The second actuator can preferably be configured as a hydraulic cylinder. However, it is also conceivable for another activating mode, for example an electric, mechanical or pneumatic activating mode, in particular of a cylinder to be chosen. The second actuator can thus also be configured as an electric motor, for example a spindle motor. A corresponding assembly having a cable pull is also conceivable in order for the activation to be designed to be purely mechanical. Independently of whether the tow bar device is configured with or without the tow bar yoke, the pivot angle can be an angle which is enclosed between the tow bar and the trailing implement part. The pivot angle can be measured as an angle that is enclosed between a longitudinal axis of the tow bar, in particular a longitudinal central axis of the tow bar, and the longitudinal axis of the implement, in particular a longitudinal central axis of the implement. The pivot angle can preferably lie in a plane which is defined by the two longitudinal axes or longitudinal central axes, particularly preferably lie in a horizontal plane which is defined by the two longitudinal axes. The pivot angle can be 0 degrees to 170 degrees, preferably 0 degrees to 150 degrees, particularly preferably 0 degrees to 130 degrees, in both pivoting directions, especially 0 degrees in a straight-line travel of the implement. In other words, the second actuator can be articulated on, in particular coupled and/or fastened to, the trailing implement part and the tow bar or the tow bar yoke and the tow bar, in such a manner that the pivot angle is adjustable, in particular also capable of being set and/or fixedly established, by activating the second actuator. Instead of between the tow bar and the trailing implement part, the pivot angle can be adjustable especially between the tow bar and the tow bar yoke. A substantial advantage of this measure is that the pivot angle can be adjusted by means of the second actuator and thus different lateral offsets of the implement, in particular of the tow bar yoke and thus indirectly of the trailing implement part, or directly of the trailing implement part in relation to the tow bar device and/or the towing vehicle, can be adjusted. Moreover the implement can advantageously be adapted to different towing vehicles having different track widths and tires of different widths. Moreover, the setting of the tilt angle can advantageously be combined with the setting of the pivot angle on account of this measure.

In one aspect of the disclosure, the tow bar device, in particular the tow bar yoke, has a holding bracket, wherein the holding bracket in part is guided through a recess in the tow bar yoke and is disposed on the tow bar yoke in such a manner that the tow bar by means of the holding bracket and the second and/or the third pivot bearing is mounted on the tow bar yoke so as to be pivotable about the first and the second vertical axis or the common vertical axis. The holding bracket and the tow bar can moreover by coupled by means of the second actuator. Furthermore, the first actuator can be pivotably mounted on the trailing implement part, in particular on the frame of the implement, and on the tow bar yoke and/or the holding bracket, in particular about a second pivot axis, parallel to the first pivot axis, on the tow bar yoke and/or the holding bracket. The holding bracket advantageously facilitates a better distribution of the engaging torques and/or forces, and thus de-stresses the first and the second pivot bearing. In one design configuration, the first and/or the second and/or the third and/or the fourth and/or the fifth pivot bearing can be a rotary bearing or a ball bearing or a tilting pin.

In one aspect of the disclosure, the implement has a control unit which may be connected to the first actuator. The control unit is capable of being operated so as to actuate the first actuator in such a manner that the tilt angle is adjustable, in particular capable of being set and/or fixedly established. The control unit may further be connected to the second actuator, and the control unit may be capable of being operated so as to actuate the second actuator in such a manner that the pivot angle is adjustable, in particular is capable of being set and/or fixedly established. The control unit can however also be situated on board the towing vehicle, or in spatial terms can be distributed across the towing vehicle and the implement. The control unit can be connected, in particular in terms of signalling, to the first actuator which serves for adjusting the tilt angle. The control unit can moreover be connected, in particular in terms of signalling, to the second actuator which serves for adjusting the pivot angle. The control unit can thus be designed and specified in such a manner that by way of the first and/or the second actuator the implement, in particular the tow bar device and/or the trailing implement part, or the tow bar and the tow bar yoke, respectively, are capable of being adjusted, in particular also mutually pivotable, in such a manner that the pivot angle and/or the tilt angle is/are capable of being determined and/or memorized and/or outputted and/or set and/or adjusted.

A method for adjusting, in particular setting and/or fixedly establishing the pivot angle and/or the tilt angle can also be capable of being carried out by way of the control unit. Moreover, the control unit in operation can actuate the first and/or the second actuator in such a manner that, for example, the longitudinal axis of the tilling element is at all times oriented so as to be at least approximately orthogonal to a nominal line, thus reducing wear in the case of a tilling element that interacts with a swath, for example. One or a plurality of sensors can especially be provided on the implement, in particular in the container or on the tilling element. The sensor or sensors can be distributed across the width of the container and/or of the tilling element. The sensor or sensors can detect a distribution, in particular a lateral distribution, of the harvested goods so as to detect a distribution of harvested goods in the container and/or a distribution of a swath, in particular a cross section or a volume of the swath, on the tilling element. The sensor or sensors can be connected to the control unit. The signal or signals of the sensor or sensors can serve as a further parameter to the control unit for actuating the first and/or the second actuator. The control unit by way of a position-determining installation and/or a detection installation can be impinged with information pertaining to the position of the nominal line. By way of a control unit of this type which varies, in particular periodically or incrementally, the pivot angle and/or the tilt angle during the travel of the implement it can advantageously be achieved that the implement that in the operating position is offset laterally outside the track of the towing vehicle carries out a travel that oscillates in the horizontal direction without the towing vehicle having to vary the direction of travel thereof, and/or the vertical alignment, in particular an operating height, of the implement can be varied while travelling. For example, a bale press or a loading wagon positioned ahead of the swath to be received can thus meander through the terrain laterally behind the towing vehicle that travels in a straight line beside the swath such that the tilling element or the receiving installation in the course of the receiving procedure acquires the comparatively narrow swath at all locations of the operating width of tilling element or receiving installation and/or at an optimal operating height, without the towing vehicle having to vary the travel direction thereof. This measure simultaneously has the advantage that the same implement can be adapted to different towing vehicles with the most minor complexity in terms of adjustment.

The disclosure further provides a tow bar device for an agricultural implement for coupling, in particular hooking up, the implement to the towing vehicle. The tow bar device may include at least one tow bar, one first actuator, and one first pivot bearing. The tow bar device can moreover include a tow bar arm and a tow bar yoke. The tow bar or the tow bar yoke at one end, by means of the first pivot bearing, can be mountable or mounted on an implement part that trails the tow bar device so as to be pivotable about the first pivot axis. The tow bar device can comprise a second pivot bearing by way of which the tow bar can be mounted on the tow bar yoke so as to be pivotable about the first vertical axis. The tow bar device can furthermore comprise the tow bar arm which extends from the tow bar, wherein the tow bar arm at one end of the tow bar arm by means of a third pivot bearing on the trailing implement part can be mountable so as to be pivotable about the second vertical axis.

The disclosure further relates to a towing vehicle/implement combination including the towing vehicle and the implement. The towing vehicle/implement combination can be a combination of the towing vehicle and the implement that is towed by the towing vehicle. The implement can be capable of being coupled, or be coupled, respectively, in particular capable of being hooked up, or be hooked up, respectively, to the towing vehicle by means of the tow bar device. The towing vehicle can be used for towing and/or pushing the implement, in particular in the agricultural sector. The towing vehicle can be an agricultural towing vehicle, especially a tractor or a tug, or the like. The towing vehicle can have two, three, or four, or a plurality of wheels, and/or have track chains. The towing vehicle can have driver's cabin, a motor, and a gearbox.

Figure 1B:
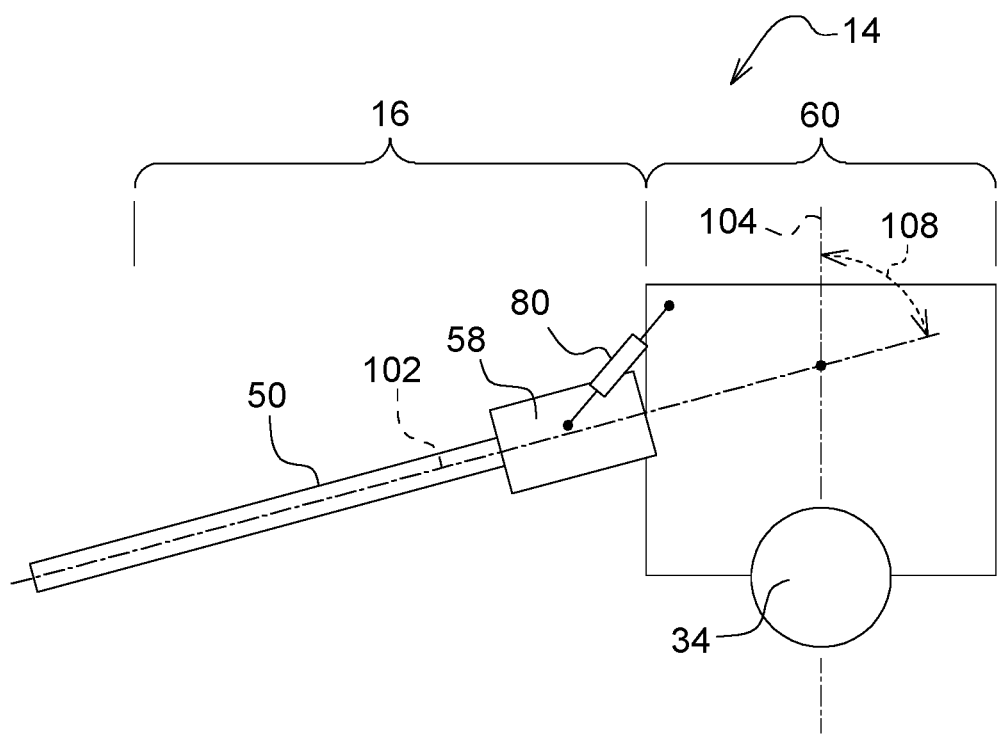
FIG. 1B is a schematic illustration of a second example embodiment of the agricultural implement having the tow bar device.

Referring to the Figures, wherein like numerals indicate like parts throughout the several views, FIGS. 1A and 1B show schematic illustrations of a first and a second example embodiment of an agricultural implement 14, having a first and a second example embodiment of a tow bar device 16 respectively.

The implement 14, here in the form of a round bale press, comprises a chassis or frame 32 (shown in FIG. 3) having a longitudinal axis 100, and supported by way of a ground-engagement means, here wheels 34, is supported on the soil. The bale pressing space 44 (shown in FIG. 3) in a manner known to those skilled in the art is delimited by pressing means (not shown). The round bale press can comprise a bale pressing chamber that is not variable in terms of size. The pressing means herein can be configured as one or more pressing rolls, in particular a multiplicity of pressing rolls. The pressing rolls, for pressing the harvested goods, run in parallel. The rotation axes of the pressing rolls in the case of a closed ejection hatch can lie on an arc, and at least one of the pressing rolls can be driven. The arrangement of the pressing rolls in the bale pressing space can correspond to a cylindrical shape such that the pressing rolls are disposed cylindrically about the round bale and configure a cylindrical circumferential face. Alternatively, the round bale press can also be configured so as to have a bale pressing chamber that is variable in terms of size, or as a round bale press having a variable bale pressing chamber, respectively, wherein the pressing means in this instance can be configured as belts, webbings, or chain assemblies.

The implement 14 includes a tow bar device 16. The tow bar device in turn includes an elongate tow bar 50 which is coupled or capable of being coupled to a towing vehicle 12 (shown in FIG. 3) and the implement 14.

As is shown in FIG. 1A, the tow bar device 16 can be designed such that the tow bar 50 at one end, by means of a first pivot bearing 52 (shown in FIG. 2) is mounted on an implement part 60 that trails the tow bar device 16, in particular the frame 32 of the implement 14, so as to be pivotable about a first pivot axis 76 (shown in FIG. 2) that is parallel to a horizontal transverse axis of the implement 14. However, as is shown in FIG. 1B, the tow bar device 16 can be designed such that a tow bar yoke 58 at one end, by means of the first pivot bearing is mounted on the implement part 60 that trails the tow bar device 16, in particular the frame 32 of the implement 14, so as to be pivotable about the first pivot axis 76 that is parallel to a horizontal transverse axis of the implement 14.

The trailing implement part 60 and the tow bar 50 (shown in FIG. 1A) or the trailing implement part 60 and the tow bar yoke 58 (shown in FIG. 1B) are coupled by means of a first actuator 80. On account thereof, the trailing implement part 60 by means of the first actuator 80 is pivotable about the first pivot axis 76 in such a manner that a tilt angle 108 between the tow bar device 16 and the trailing implement part 60 is capable of being set. Moreover, a control unit (shown in FIG. 3) can be connected to the first actuator 80. The control unit 90 is capable of being operated so as to actuate the first actuator 80 in such a manner that the tilt angle 108 is capable of being set. As can be derived from FIGS. 1A and 1B, the tilt angle 108 corresponds to an angle which is enclosed by a longitudinal axis 102 of the tow bar 50 and implement vertical axis 104.

Figure 2:
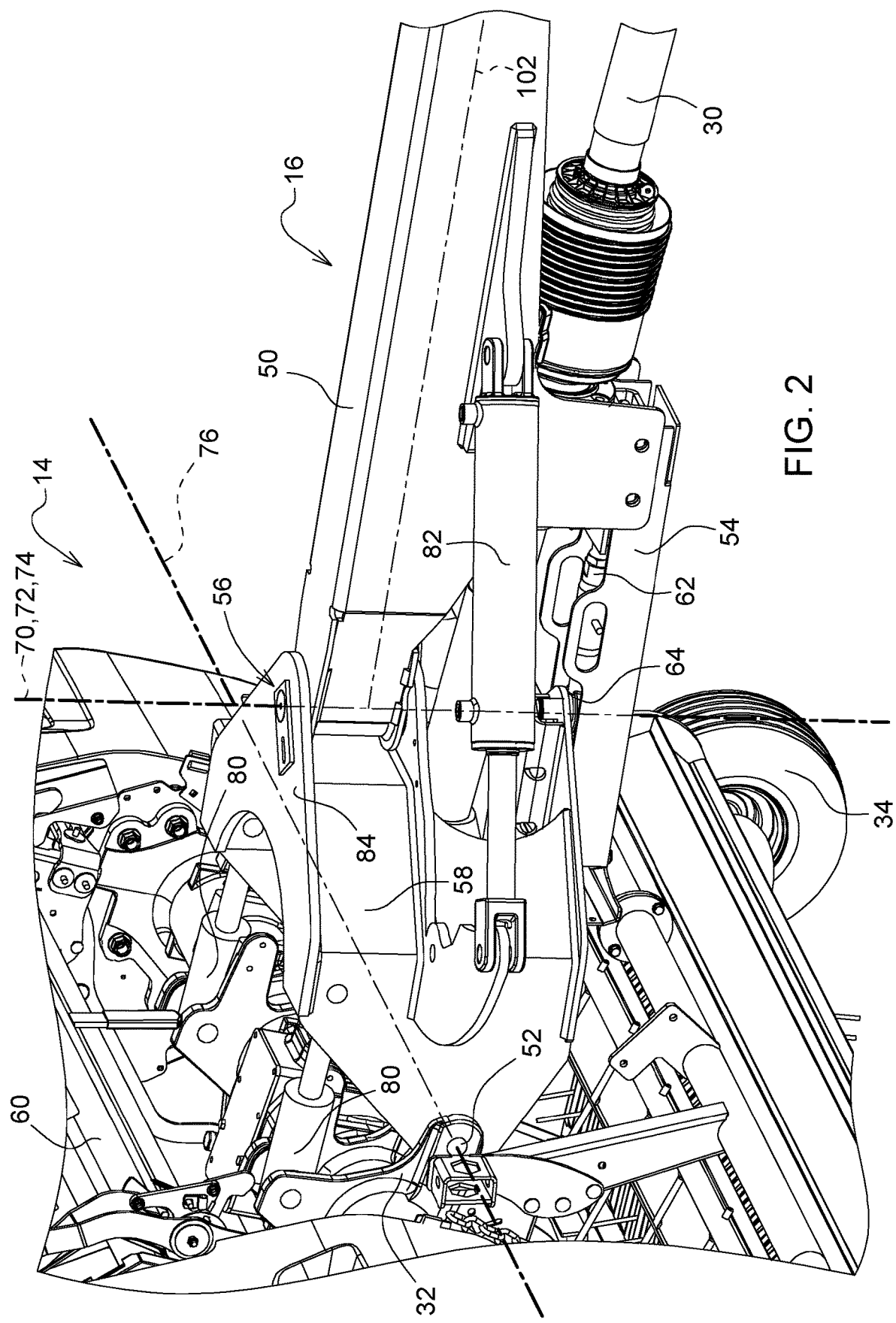
FIG. 2 is a schematic partial perspective view of the second example embodiment of the agricultural implement and the tow bar device.

Referring to FIG. 2, the illustration shown in FIG. 2 corresponds substantially to the implement 14 and tow bar device 16, respectively, shown in FIG. 1B. The tow bar yoke 58 is mounted on the trailing implement part 60 so as to be pivotable about the first pivot axis 76. The trailing implement part 60 and the tow bar yoke 14 are coupled by means of two first actuators 80. On account thereof, the tow bar yoke 58 and thus the tow bar device 16 by means of the first actuators 80 are pivotable about the first pivot axis 76 in such a manner that the tilt angle 108 between the tow bar device 16 and the trailing implement part 60 is capable of being set. The tow bar yoke 58 by means of the first pivot axis 52 which is configured as two tilting pins is mounted on the trailing implement part 60 so as to be pivotable about the first pivot axis 76. The tow bar device 16, and more particularly the tow bar yoke 58, includes a holding bracket 84. The holding bracket 84 in part is guided through a recess in the tow bar yoke 58 and is disposed on the tow bar yoke 58 in such a manner that the tow bar 50 by means of the holding bracket 84 and a second pivot bearing 56, here likewise configured as a tilting pin, is mounted on the tow bar yoke 58 so as to be pivotable about a first vertical axis 70, or a common vertical axis 74, respectively. The holding bracket 84 and thus the tow bar yoke 58 and the tow bar 50 are coupled by means of a second actuator 82. A tow bar arm 54, by means of the holding bracket 84 and a third pivot bearing 64, here likewise configured as a tilting pin, can also additionally be mounted on the tow bar yoke 58 so as to be pivotable about a second vertical axis 72, or the common vertical axis 74 respectively.

Figure 3:
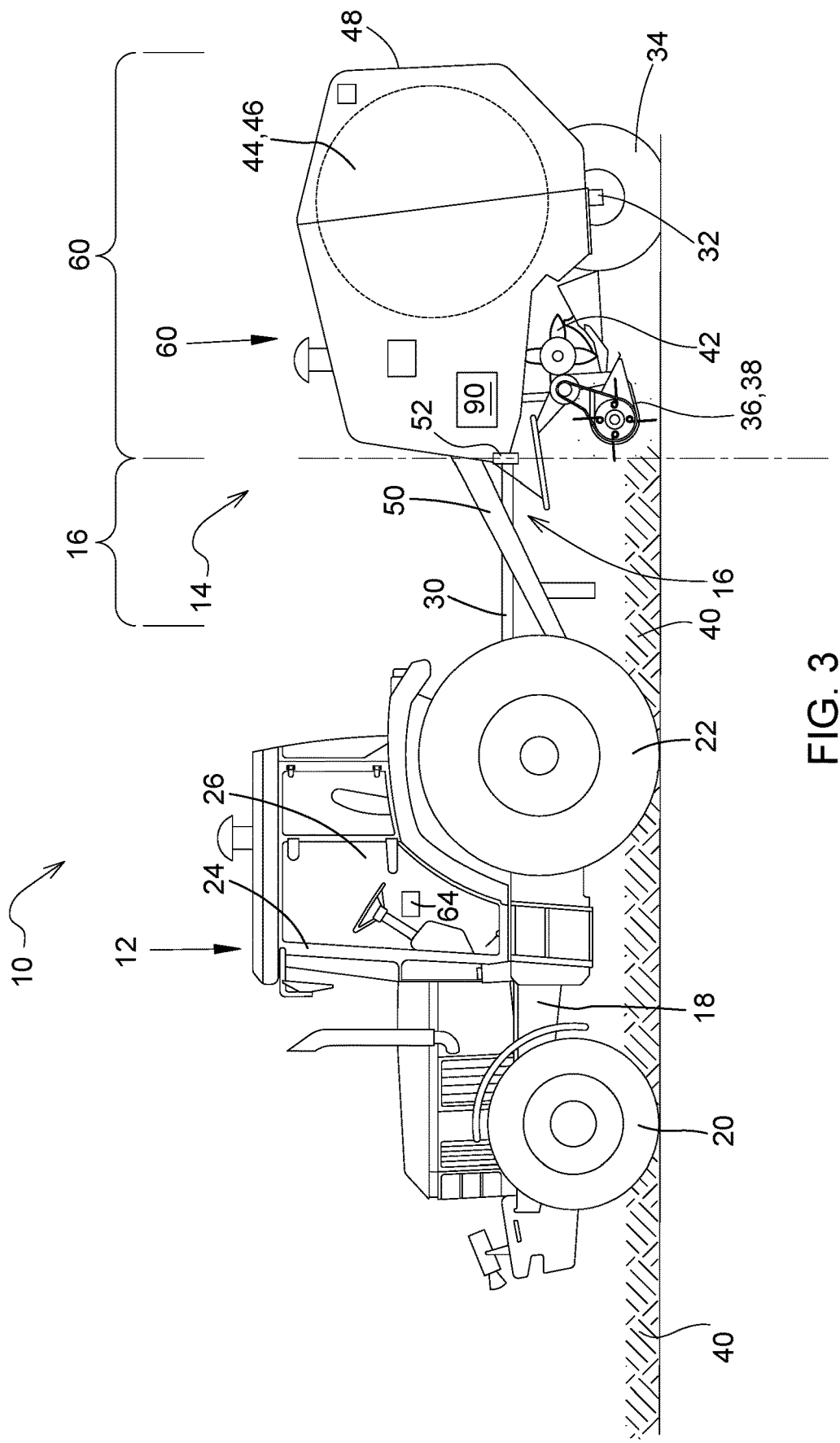
FIG. 3 is a schematic elevation view of a combination of a towing vehicle and the first example embodiment of the agricultural implement.

FIG. 3 shows a schematic lateral view of a towing vehicle/implement combination 10. The towing vehicle/implement combination 10 includes the towing vehicle 12 and the implement 14 in the form of a round bale press. The implement 14 is coupled to the towing vehicle 10 by means of the tow bar device 16. The towing vehicle 12 is an agricultural vehicle in the form of a tractor, wherein the fundamental construction of a tractor is assumed to be known. The towing vehicle 10 is constructed on a supporting frame 18 which is supported on steerable front wheels 20 and rear wheels 22 and supports a cabin 24 in which an operator workplace 26 is situated. The front wheels 20 and/or the rear wheels 22 are driven by a motor which is configured in the form of an internal combustion engine and by a gearbox which interacts with the latter. Besides the frame 32 and the wheels 34, the implement 14 comprises a tilling element 36 in the form of a goods receiver 38 for receiving harvested goods lying in a swath 40 on the soil, and a conveyor 42 which conveys the harvested goods received by the goods receiver 38 into a container 46 in the form of a bale pressing space 44. A finished bale can be ejected through an upwardly pivotable rear door 48 and deposited on the field. The mechanical drive of the driven elements of the implement 14 takes place by way of a drive component 30, in particular a power take-off shaft 30, from the towing vehicle 10, while a drive by electric motors which are supplied with electric energy from the towing vehicle 10 would also be conceivable. The implement 14 has a control unit 90 which is connected to the first actuator 80. The control unit 90 is capable of being operated so as to actuate the first actuator 80 in such a manner that the tilt angle 108 is capable of being set. The implement 14 can moreover include the second actuator 82 (shown in FIG. 2). The control unit 90 can also be connected to the second actuator 82, and the control unit 90 can be capable of being operated so as to actuate the second actuator 82 in such a manner that a pivot angle 106 (shown in FIGS. 6A and 6B) is capable of being set.

Figure 4:
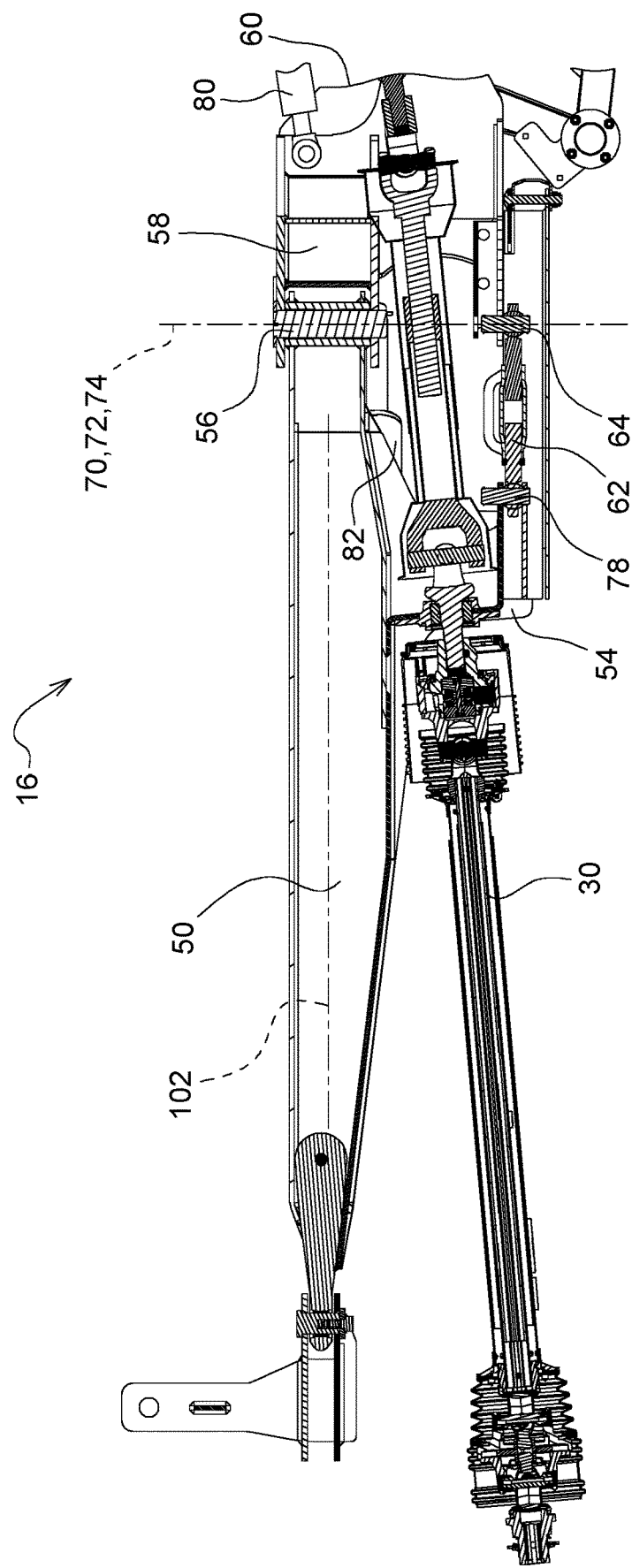
FIG. 4 is a schematic cross-sectional view of the second example embodiment of the agricultural implement.

Referring to FIG. 4, the tow bar device 16 includes the tow bar 50, from which the tow bar arm 54 extends and which is configured as part of the tow bar 50 as well as the tow bar yoke 58. The tow bar 50 at one end by means of the second pivot bearing 56 is mounted on the tow bar yoke 58 so as to be pivotable about the first vertical axis 70. The tow bar arm 54 comprises a tensioning installation 62, wherein the tensioning installation 62 at one end of the tensioning installation 62 includes the third pivot bearing 64. On account thereof, the tensioning means 62 by means of the third pivot bearing 64 on the tow bar yoke 58 is mounted so as to be pivotable about the second vertical axis 72. The tensioning installation 62 at the other end of the tensioning installation 62 moreover comprises a fourth pivot bearing 78 by way of which the tensioning installation 62 is pivotably mounted on a part of the tow bar arm 54 that is fixedly connected to the tow bar 50.

The first and the second vertical axes 70, 72 are disposed so as to coincide in spatial terms and configured as a common vertical axis 74. Likewise, the second and the third pivot bearings 56, 64 are disposed so as be mutually spaced apart along the common vertical axis 74. Moreover, the tow bar 50 and the tow bar yoke 58 are coupled by means of the second actuator 82. The second actuator 82 is embodied as a hydraulic cylinder. The trailing implement part 60 or the tow bar yoke 58, and/or the tow bar 50, by means of the second actuator 82 are pivotable about the first and the second vertical axis 70, 72, or the common vertical axis 74, respectively, in such a manner that the pivot angle 106 between the tow bar 50 and the trailing implement part 60, or the tow bar 50 and the tow bar yoke 58, is capable of being set. Furthermore, the drive component 30 is disposed between the first and the third pivot bearings 56, 64. Moreover, the drive component 30 may include two parts, mounted in the tow bar arm 54, and guided through the tow bar arm 54. The first and the second drive component part are connected to one another by means of a universal joint. The universal joint is mounted in the tow bar arm 54. The first drive component part is capable of being coupled to the power take-off shaft of the towing vehicle 12 and the universal joint, and the second drive component part is coupled to the universal joint and the drive shaft of the implement 14. The second drive component part is disposed between the second and the third pivot bearing 56, 64.

Figure 5A:
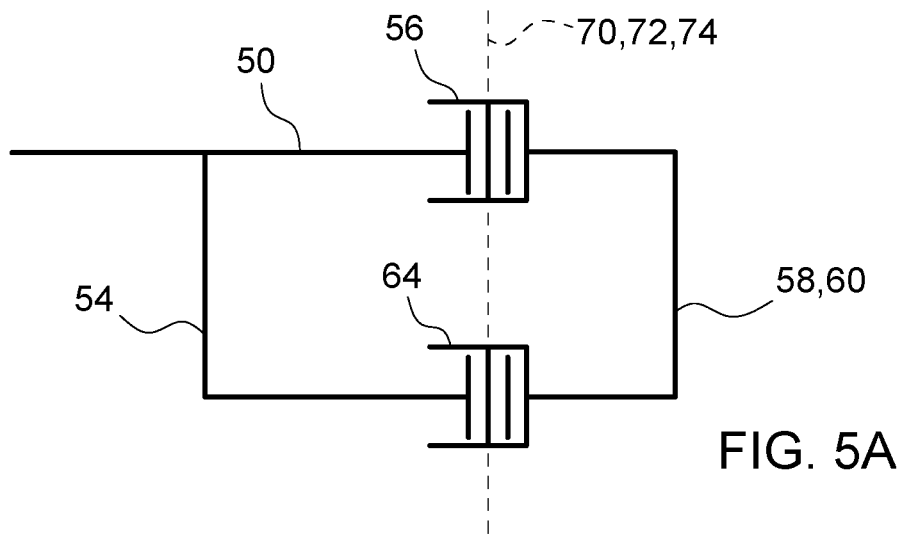
FIG. 5A is a schematic elevation view showing a first example of a relative size between a second pivot bearing and a third pivot bearing of the first example embodiment of the agricultural implement.
Figure 5B:
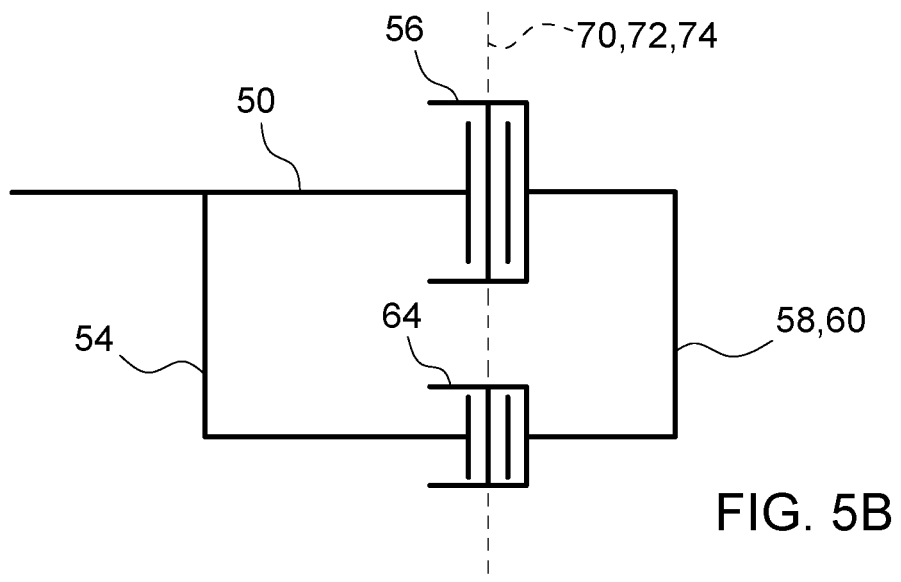
FIG. 5B is a schematic elevation view showing a second example of a relative size between the second pivot bearing and the third pivot bearing of the first example embodiment of the agricultural implement.
Figure 5C:
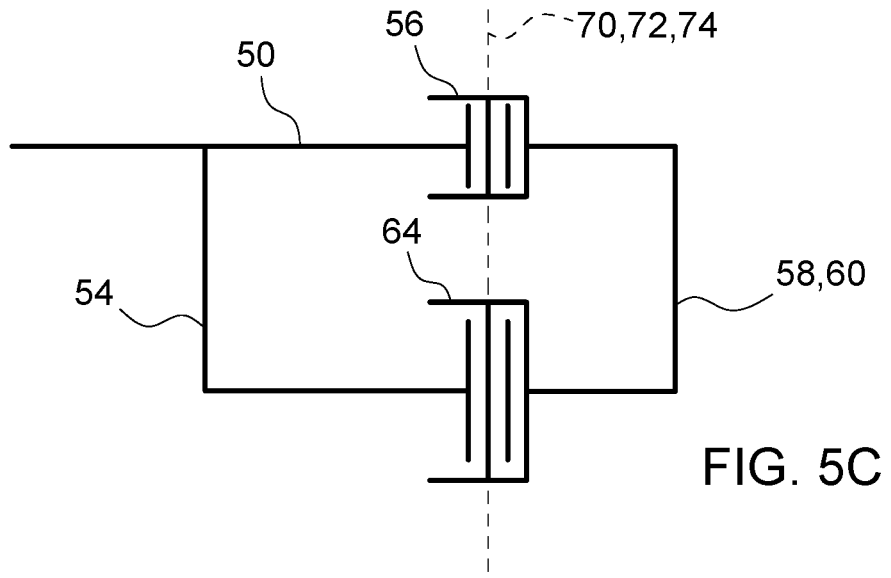
FIG. 5C is a schematic elevation view showing a third example of a relative size between the second pivot bearing and the third pivot bearing of the first example embodiment of the agricultural implement.

Referring to FIG. 5A, the second and third pivot bearings 56, 64 shown in FIG. 5A are of identical size. In FIG. 5B, the second pivot bearing 56 is larger than the third pivot bearing 64, that is to say that the second pivot bearing 56 is designed for absorbing higher forces than the third pivot bearing 64. In FIG. 5C the situation is exactly the reverse, that is to say that the second pivot bearing 56 is smaller than the third pivot bearing 64, that is to say that the third pivot bearing 64 is designed for absorbing higher forces than the second pivot bearing 56.

Figure 6A:
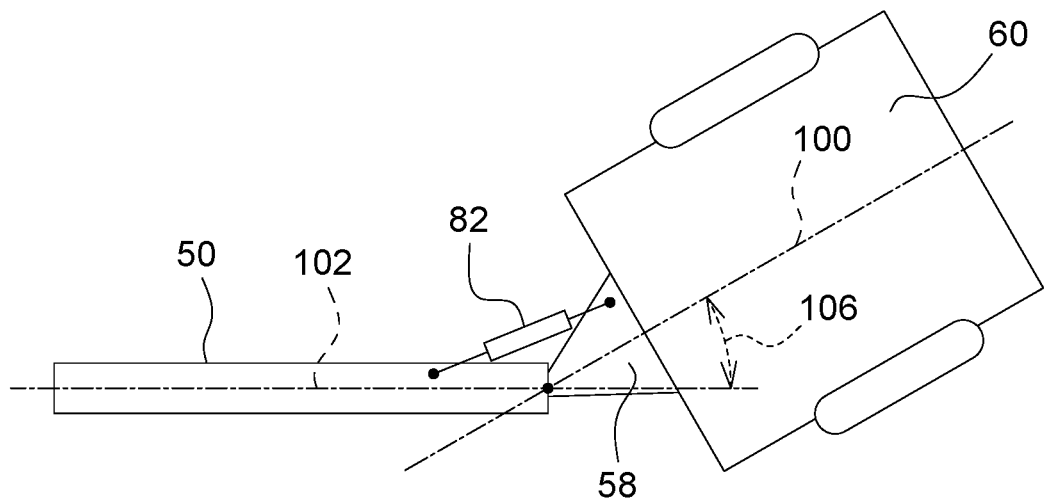
FIG. 6A is a schematic plan view of the second example embodiment of the agricultural implement.
Figure 6B:
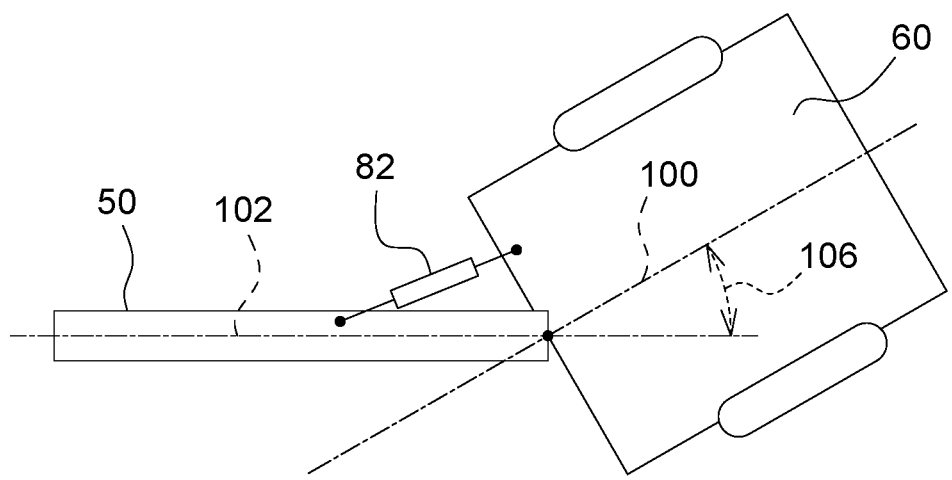
FIG. 6B is a schematic plan view of the first example embodiment of the agricultural implement.

Referring to FIGS. 6A and 6B, independently of whether the tow bar device 16 is configured with (FIG. 6A) or without (FIG. 6B) the tow bar yoke 58, the pivot angle 106 corresponds to an angle which is enclosed by a longitudinal axis 102 of the tow bar 50 and the longitudinal axis 100 of the frame 32 of the implement 14.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. An agricultural implement comprising:
   a frame;
   a tow bar;
   at least one first pivot bearing rotatably interconnecting the frame and the tow bar, whereby the tow bar is rotatable about a first pivot axis relative to the frame, wherein the first pivot axis is horizontal and transverse to a longitudinal axis of the frame;
   a yoke interconnecting the frame and the tow bar, such that the yoke and the tow bar rotate together about the first pivot axis; and
   a first actuator interconnecting the frame and the tow bar and operable to rotate the tow bar about the first pivot axis relative to the frame to adjust a tilt angle defined between a longitudinal axis of the tow bar and a vertical axis of the frame.

2. The agricultural implement set forth in claim 1, further comprising a second pivot bearing rotatably interconnecting the yoke and the tow bar, whereby the tow bar is rotatable about a first vertical axis relative to the yoke.

3. The agricultural implement set forth in claim 2, further comprising an arm attached to the tow bar and disposed vertically below the tow bar, wherein the arm is rotatable with the tow bar relative to the yoke about the first vertical axis.

4. The agricultural implement set forth in claim 3, further comprising a third pivot bearing rotatably interconnecting the yoke and the arm.

5. The agricultural implement set forth in claim 4, wherein the second pivot bearing and the third pivot bearing are spaced apart from each other along the first vertical axis.

6. The agricultural implement set forth in claim 4, further comprising a drive component disposed between the arm and the tow bar, and further disposed between the second pivot bearing and the third pivot bearing.

7. An agricultural implement comprising:
   a frame;
   a tow bar;
   at least one first pivot bearing rotatably interconnecting the frame and the tow bar, whereby the tow bar is rotatable about a first pivot axis relative to the frame, wherein the first pivot axis is horizontal and transverse to a longitudinal axis of the frame;
   a first actuator interconnecting the frame and the tow bar and operable to rotate the tow bar about the first pivot axis relative to the frame to adjust a tilt angle defined between a longitudinal axis of the tow bar and a vertical axis of the frame;
   a second pivot bearing rotatably interconnecting the yoke and the tow bar, whereby the tow bar is rotatable about a first vertical axis relative to the yoke;
   an arm attached to the tow bar and disposed vertically below the tow bar, wherein the arm is rotatable with the tow bar relative to the yoke about the first vertical axis;
   a third pivot bearing rotatably interconnecting the yoke and the arm; and
   wherein the second pivot bearing and the third pivot bearing are co-axially located along the first vertical axis.

8. The agricultural implement set forth in claim 1, further comprising a control unit disposed in communication with the first actuator and operable to control the first actuator to adjust the tilt angle.

9. The agricultural implement set forth in claim 1, wherein the at least one first pivot bearing is laterally offset along the first pivot axis relative to a first vertical axis and relative to the longitudinal axis of the frame.

10. An agricultural implement comprising:
    a frame;
    a tow bar;
    at least one first pivot bearing rotatably interconnecting the frame and the tow bar, whereby the tow bar is rotatable about a first pivot axis relative to the frame, wherein the first pivot axis is horizontal and transverse to a longitudinal axis of the frame;
    a first actuator interconnecting the frame and the tow bar and operable to rotate the tow bar about the first pivot axis relative to the frame to adjust a tilt angle defined between a longitudinal axis of the tow bar and a vertical axis of the frame;
    a yoke interconnecting the frame and the tow bar, such that the yoke and the tow bar rotate together about the first pivot axis;
    a second pivot bearing rotatably interconnecting the yoke and the tow bar, whereby the tow bar is rotatable about a first vertical axis relative to the yoke; and
    a second actuator interconnecting the frame and the tow bar, wherein the second actuator is operable to rotate the tow bar about the first vertical axis relative to the yoke to adjust a pivot angle defined between the longitudinal axis of the tow bar and the longitudinal axis of the frame.

11. The agricultural implement set forth in claim 10, further comprising a control unit disposed in communication with the second actuator and operable to control the second actuator to adjust the pivot angle.

12. An agricultural implement comprising:
    a frame;
    a tow bar;
    a yoke attached to an end of the tow bar;
    at least one first pivot bearing rotatably interconnecting the frame and the yoke, whereby the yoke and the tow bar are jointly rotatable about a first pivot axis relative to the frame, wherein the first pivot axis is horizontal and transverse to a longitudinal axis of the frame;
    wherein the at least one first pivot bearing is laterally offset along the first pivot axis relative to a first vertical axis and relative to the longitudinal axis of the frame;
    a second pivot bearing rotatably interconnecting the yoke and the tow bar, whereby the tow bar is rotatable about the first vertical axis relative to the yoke;
    a first actuator interconnecting the frame and at least one of the tow bar or the yoke, wherein the first actuator is operable to rotate the yoke and the tow bar about the first pivot axis relative to the frame to adjust a tilt angle defined between a longitudinal axis of the tow bar and a vertical axis of the frame; and
    a second actuator interconnecting the tow bar and at least one of the frame or the yoke, wherein the second actuator is operable to rotate the tow bar about the first vertical axis relative to the yoke to adjust a pivot angle defined between the longitudinal axis of the tow bar and the longitudinal axis of the frame.

13. The agricultural implement set forth in claim 12, further comprising an arm attached to the tow bar and disposed vertically below the tow bar, wherein the arm is rotatable with the tow bar relative to the yoke about the first vertical axis.

14. The agricultural implement set forth in claim 13, further comprising a third pivot bearing rotatably interconnecting the yoke and the arm.

15. The agricultural implement set forth in claim 14, wherein the second pivot bearing and the third pivot bearing are co-axially located along the first vertical axis.

16. The agricultural implement set forth in claim 14, wherein the second pivot bearing and the third pivot bearing are spaced apart from each other along the first vertical axis.

17. The agricultural implement set forth in claim 14, further comprising a drive component disposed between the arm and the tow bar, and further disposed between the second pivot bearing and the third pivot bearing.

18. The agricultural implement set forth in claim 12, further comprising a control unit disposed in communication with the first actuator and the second actuator, wherein the control unit is operable to control the first actuator to adjust the tilt angle, and to control the second actuator to adjust the pivot angle.

* * * * *